(12) United States Patent
Sim

(10) Patent No.: US 8,023,473 B2
(45) Date of Patent: Sep. 20, 2011

(54) MULTIPLE WIRELESS NETWORKS MANAGEMENT

(75) Inventor: Hong Cheng Michael Sim, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 885 days.

(21) Appl. No.: 11/792,798

(22) PCT Filed: Dec. 14, 2004

(86) PCT No.: PCT/SG2004/000410
§ 371 (c)(1),
(2), (4) Date: Jun. 11, 2007

(87) PCT Pub. No.: WO2006/065224
PCT Pub. Date: Jun. 22, 2006

(65) Prior Publication Data
US 2008/0205350 A1    Aug. 28, 2008

(51) Int. Cl.
*H04J 3/00*    (2006.01)
*H04W 4/00*    (2009.01)
*H04W 40/00*    (2009.01)
*H04L 12/413*   (2006.01)

(52) U.S. Cl. ......... 370/336; 370/338; 370/448; 455/448

(58) Field of Classification Search .................. 455/448; 370/336, 338, 448
See application file for complete search history.

(56) References Cited

U.S. PATENT DOCUMENTS

| | | | |
|---|---|---|---|
| 6,377,608 B1 | 4/2002 | Zyren | |
| 2003/0063619 A1 | 4/2003 | Montano et al. | |
| 2003/0152059 A1 | 8/2003 | Odman | |
| 2004/0013127 A1 | 1/2004 | Shvodian | |
| 2004/0053621 A1* | 3/2004 | Sugaya | 455/450 |
| 2004/0063426 A1 | 4/2004 | Hunkeler | |
| 2006/0040701 A1* | 2/2006 | Long et al. | 455/525 |

* cited by examiner

*Primary Examiner* — Marisol Figueroa
(74) *Attorney, Agent, or Firm* — Patterson Thuente Christensen Pedersen P.A.

(57) ABSTRACT

A multiple wireless networks structure comprising a plurality of beacon groups each comprising one or more devices communicating via an associated wireless network utilizing a superframe structure; wherein each device of each beacon group allocates a local control period and one or more neighbor control periods in each superframe; wherein the neighbor control periods in each beacon group cover all one or more control periods of other beacon groups detected by one or more of the devices in said each beacon group to an extent as said control periods do not overlap with the local control period in said each beacon group.

15 Claims, 7 Drawing Sheets

MULTIPLE WIRELESS NETWORKS MANAGEMENT

FIELD OF INVENTION

The present invention relates broadly to a multiple wireless networks structure, a method of managing a wireless multiple networks structure, and to a method of announcing the presence of a first beacon group to a second beacon group.

BACKGROUND

In view of problems of the Wireless Personal Area Network (WPAN) MAC protocol of the IEEE standard 802.15.3, which is based on a centralized-control protocol, the Multi-Band OFDM (Orthogonal Frequency Division Multiplexing) Alliance (MBOA) group started its MBOA MAC subgroup. To address the problems of the IEEE 802.15.3 MAC such as Simultaneous Operating Piconet and Mobility issues, the MBOA MAC is based on a distributed protocol rather than a centralized-controlled one. In order for every device to be able to form a network by itself, each device is required to beacon in a distributed fashion. The MBOA MAC v0.5 defines the superframe of a device to be of 65536 μs. The superframe is to be composed of 256 Media Access Slots (MASs) where each MAS length is 256 μs. The first 8 MASs of a superframe, relative to an individual group, are defined as a Beacon Period (BP) and are sub-divided into 24 Beacon Slots (BSs). The rest of the MASs in the superframe are used for data transfer, employing either EDCA (Enhanced Distributed Channel Access) (data contention method) or DRP (Distributed Reservation Protocol) (data reservation method). The superframe 100 of MBOA MAC is illustrated in FIG. 1.

Devices powering up first scan the medium for any existing network by listening to beacon frames. If beacon frames are heard, each device attempts to broadcast their beacon in a randomly selected vacant BS. Devices receive the BS occupancy information via the beacon of neighboring devices through the Beacon Period Occupancy Information Element (BPOIE) transmitted together within every beacon.

In order to support more than 24 devices in different groups operating simultaneously, the MBOA MAC protocol allows devices to create and broadcast their beacons in new BPs different from existing ones. This means that in a superframe of a device, there can be multiple BPs used by other neighboring devices. Another reason for having multiple BPs is network merging between 2 or more Beacon Groups (BG), illustrated in FIG. 2. A BG is formed by 1 or more devices beaconing in the same BP.

The MBOA MAC protocol allows devices within the same BG to communicate. Since each device listens in the BP of the local cluster around each device, data reservation announcements in the BG can be heard via beacon frames. However, for a device to communicate with another device in another BG, the communicating device is required to beacon in the target device's BP as well.

When a neighboring BG is detected, first the local BG informs the devices in the local BG of the presence of the neighboring BG via the beacon of the local BG. In addition, the local BG attempts to inform the neighboring BG if the local BG determines that the local BG is not protected in the same way as the neighboring BG. To do so, the local BG transmits a beacon frame in the BP of the neighboring BG for a number of consecutive superframes. The BS the local device uses is chosen at random from the list of available vacant slots.

In mandating a device to beacon in a neighboring BP so that data communication is enabled across BGs, unnecessary beaconing is imposed on the beaconing device.

To protect the neighboring BG, a device sends out a reservation request to block devices in the local BG from using the BP of the neighboring BG. In the case of multiple neighboring BGs having one or more BPs overlapping, a device has to send this reservation multiple times.

When making a neighboring BG announcement, a device uses a BS of the neighboring BG's BP. The neighboring BG's BP may be running low in available BSs and this might cause new devices not being able to join the neighboring BG. In addition, if there are no more BSs available, that neighboring BG cannot be informed of the presence of the local BG.

In addition, if multiple BGs make announcement beaconing to the same neighboring BG, announcement beacon frames may colloid. This makes announcement beaconing unreliable.

SUMMARY

In accordance with a first aspect of the present invention there is provided a multiple wireless networks structure comprising a plurality of beacon groups each comprising one or more devices communicating via an associated wireless network utilising a superframe structure; wherein each device of each beacon group allocates a local control period and one or more neighbor control periods in each superframe; wherein the neighbor control periods in each beacon group cover all one or more control periods of other beacon groups detected by one or more of the devices in said each beacon group to an extent as said control periods do not overlap with the local control period in said each beacon group.

The local control period of each beacon group may comprise a beacon period for beacon announcements in said each beacon group, and a non-reservation period for communications other than said beacon announcements in said each beacon group.

The local control period of each beacon group may further comprise one or more neighbor non-reservation periods covering respective non-reservation periods of one or more other beacon groups detected by one or more devices in said each beacon group to an extent as said respective non-reservation periods do overlap with the beacon period in said each beacon group.

The superframes of the respective beacon groups may further comprise one or more data periods outside the local control period and the neighbor control periods, for data communications.

In accordance with a second aspect of the present invention there is provided a method of managing a wireless multiple networks structure comprising a plurality of beacon groups each comprising one or more devices communicating via an associated wireless network utilising a superframe structure, the method comprising allocating, for each beacon group, a local control period and one or more neighbor control periods in each superframe; wherein the neighbor control periods in each beacon group cover all one or more control periods of other beacon groups detected by one or more of the devices in said each beacon group to an extent as said control periods do not overlap with the local control period in said each beacon group.

The local control period of each beacon group may comprise a beacon period for beacon announcements in said each beacon group, and a non-reservation period for communications other than said beacon announcements in said each beacon group.

The local control period of each beacon group may further comprise one or more neighbor non-reservation periods covering respective non-reservation periods of one or more other beacon groups detected by one or more devices in said each beacon group to an extent as said respective non-reservation periods do overlap with the beacon period in said each beacon group.

The superframes of the respective beacon groups may further comprise one or more data periods outside the local control period and the neighbor control periods, for data communications.

In accordance with a third aspect of the present invention there is provided a method of announcing the presence of a first beacon group to a second beacon group, each beacon group comprising one or more devices communicating via an associated wireless network utilising a superframe structure, the method comprising each device of the first group listening for a beacon broadcast from a device of the second beacon group outside a control period of the superframe structure in the first beacon group; detecting of said beacon broadcast by at least one of the devices of the first group; said at least one device of the first group including in a beacon broadcast to the other devices in the first group data identifying a control period of the second beacon group; and allocating, in the first beacon group, a neighbor control period in each superframe covering said control period of the second beacon group relative to the superframe structure of the first beacon group.

The method may further comprise said at least one device of the first beacon group listening during said neighbor control period for beacon broadcasts from one or more devices of the second group; and determining whether any such beacon broadcast comprises data identifying the control period, of the first beacon group.

The method may further comprise said at least one of the devices of the first beacon group making an announcement during said neighbor control period.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

In the example embodiment, a device only broadcasts a beacon frame once in every superframe even if the device communicates with a device in another BG. This can have the advantage of reducing power consumption as well as reducing implementation complexity.

A Non-Reservation Period (NRP) in the example embodiment provides a mechanism for neighboring BG announcement even in the case where the neighboring BG is full. This can solve the problem of the prior art where an announcement cannot be made when all BSs are used. During NRP, a contention medium access mechanism is used. In the case where multiple BGs attempt to make a BG announcement simultaneously, the contention-based mechanism of the example embodiment can provide a robust method to prevent and resolve collisions.

Each device manages neighboring BG announcement using a Local Control Period (LCP) and a Neighbor Control Period (NCP) concept in the example embodiment. In the case of multiple overlapped BGs, only a single NCP is required to describe the period that is not to be used for data communication. This reduces the overhead in sending multiple BP reservations in the prior art.

The LCP and NCP concepts in the example embodiment also help to improve the spatial efficiency of the medium. In the case where a BG overlaps a local BG, the overlapped portion of a Control Period (CP) can be used by both BGs. The non-overlapped portion of the CP is treated as NCP.

Figure 1:
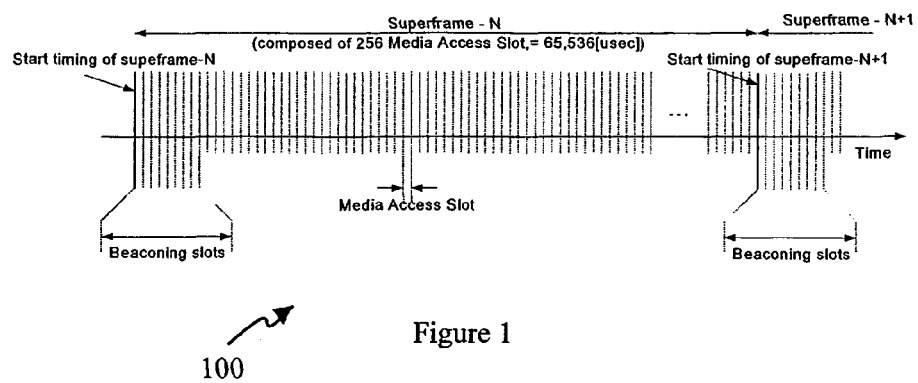
FIG. 1 shows the timing structure of a prior art superframe of MBOA MAC v0.5 draft specification.
Figure 2:
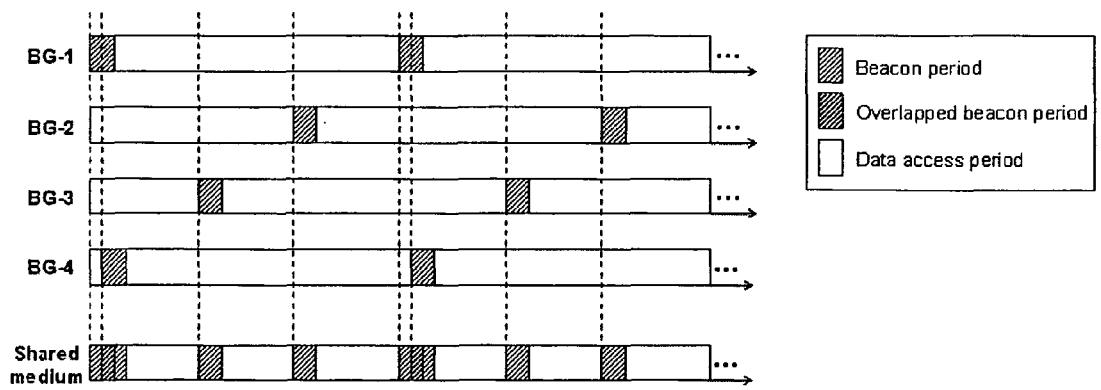
FIG. 2 is a schematic drawing illustrating how multiple BPs in a prior art superframe can be caused by network merging of multiple BGs.
Figure 3:
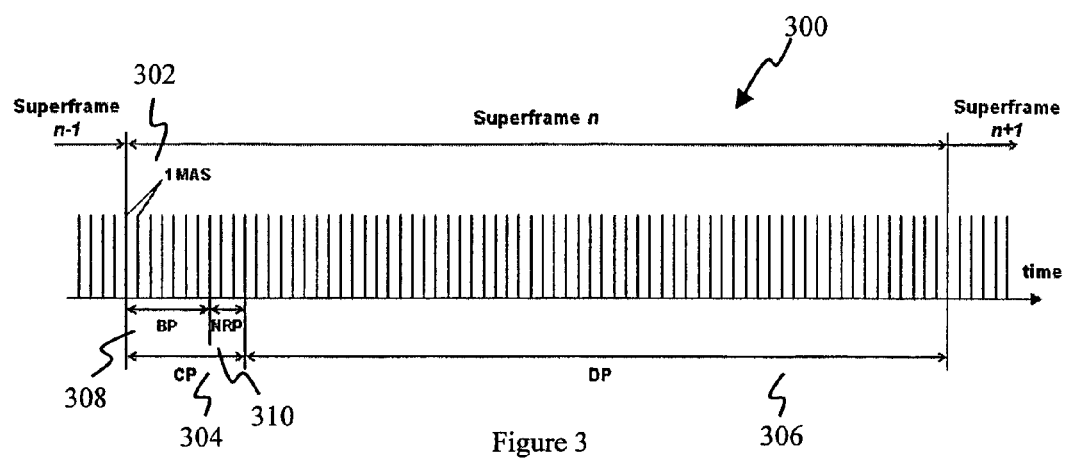
FIG. 3 shows the timing structure of a superframe according to an example embodiment.

The distributed beaconing method in the example embodiment performs the following operations. Each device broadcasts a beacon frame periodically. For each device, the timing structure is a superframe. The superframe structure is defined as shown in FIG. 3 for the example embodiment. With reference to FIG. 3, the superframe 300 is divided into a finite number of MASs, e.g. 302. The number of MASs may have typical values of 64, 128, 256 or any integer number of slots. The MASs in the superframe 300 are divided into a CP 304 and a Data Period (DP) 306. The number of MASs used for CP 304 and DP 306 can be predetermined in any configuration provided that they add up to the total number of MASs in the superframe 300. One example is to have CP 304 using 8 slots, DP 306 using 248 slots, making the number of MASs in the superframe 300 to be 256. The CP 304 is further divided into a BP 308 and a NRP 310. Again, period BP and NRP uses a pre-determined number of MASs. A superframe is uniquely identified by its Beacon Period Start Time (BPST).

Figure 4:
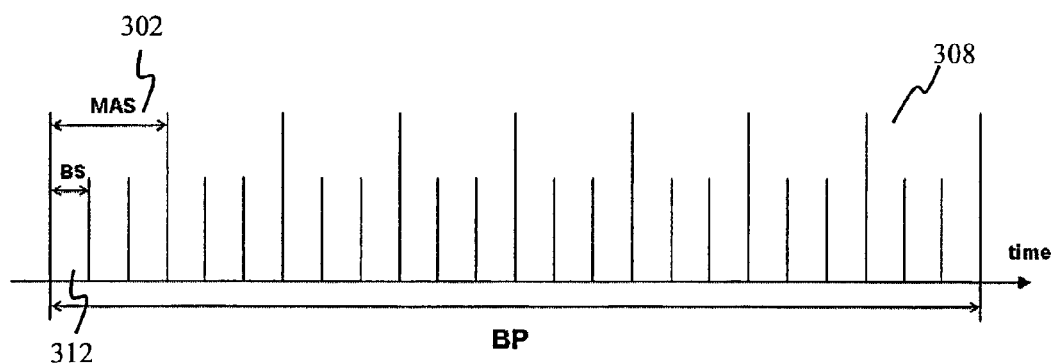
FIG. 4 shows the timing structure of a BP according to an example embodiment.

The BP 308 itself is subdivided into BSs e.g. 312, as shown in FIG. 4. Each MAS e.g. 302 in the BP 308 may be divided into several BSs. In the case of FIG. 4, 1 MAS is divided into 3 BSs. In other variations of the implementation, 1 MAS may correspond to 1 BS, or may be divided into 2, 4, 5 or any number of BSs.

In this the example embodiment, each device broadcasts a beacon frame once during every superframe. Each device broadcasts its beacon frames in a BS.

Before data communication can take place, a device must either create a new BG or join an existing BG. Once a device starts broadcasting a beacon frame on one particular BS, the device shall continue to use that BS unless a collision is detected. If a collision is detected, a collision resolution protocol such as the one in the prior art of MBOA MAC specification can be used in the example embodiment. Other collisions resolution protocols may be used in different embodiments.

Figure 5:
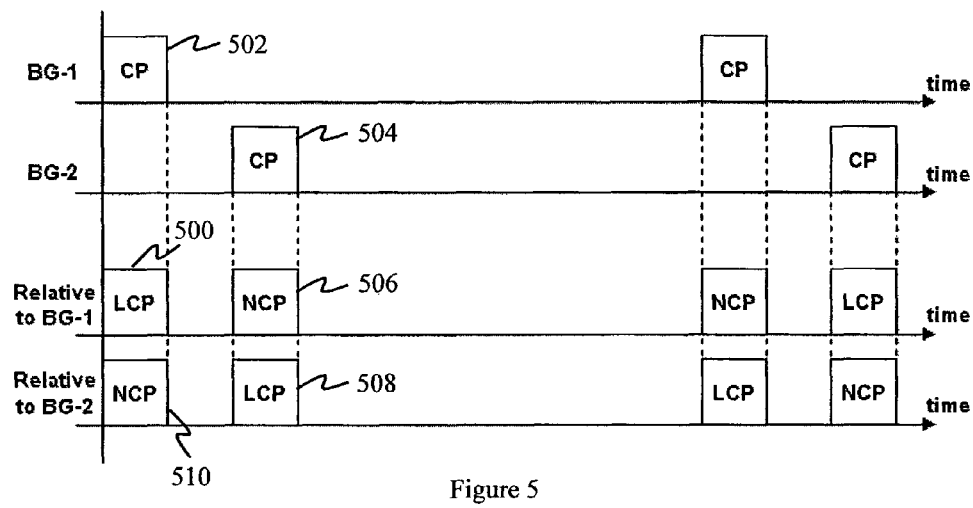
FIG. 5 illustrates the concept of LCP and NCP according to an example embodiment.

In addition to the devices in the same BG, there may be other devices in the radio vicinity that use different BPs of different BPSTs. In that case, two or more BGs may coexist. As shown in FIG. 5, relative to BG-1, the CP 502 used by the local BG is defined as LCP 500. The CP 504 used by the neighboring BG-2 is defined as NCP 506. The DP that is supposed to be shared by any devices regardless of BG are the same, and not shown in FIG. 5.

Similarly, relative to BG-2, the CP 504 used by the local BG is defined as LCP 508, and the CP 502 used by the neighboring BG-1 is define as NCP 510. Again, the DP that is supposed to be shared by any devices regardless of BG are the same.

Figure 6:
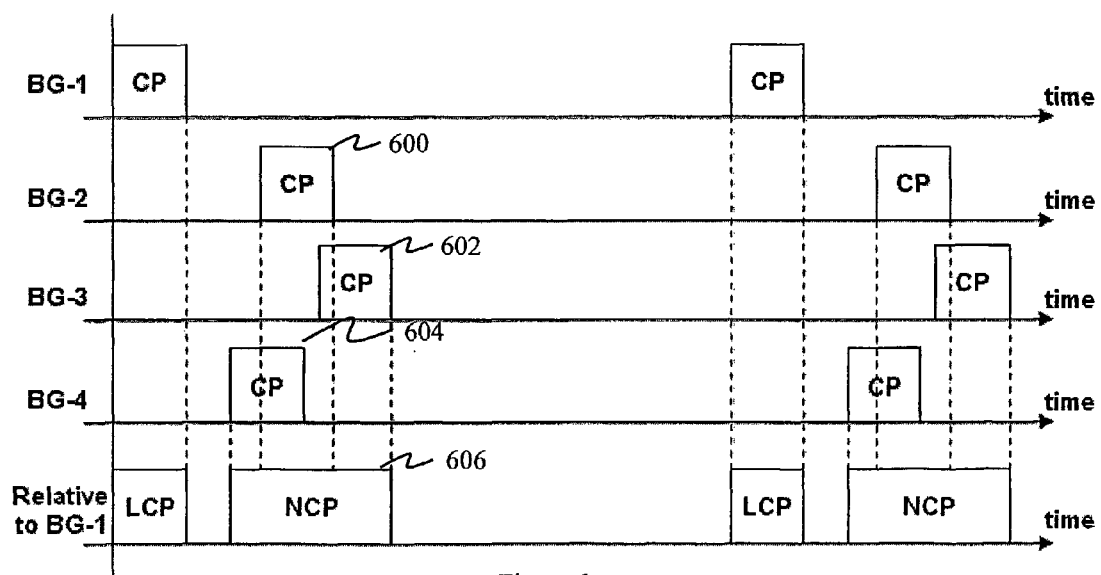
FIG. 6 shows the formation of an extended NCP from overlapped CPs according to an example embodiment.

The CPs of the neighboring BGs may overlap, as shown in FIG. 6. In that case, relative to BG-1, the CPs 600, 602, 604 of the overlapped BGs will be combined to form a NCP 606 that extends across all consecutive MASs, that are used by the neighboring BGs.

Figure 7:
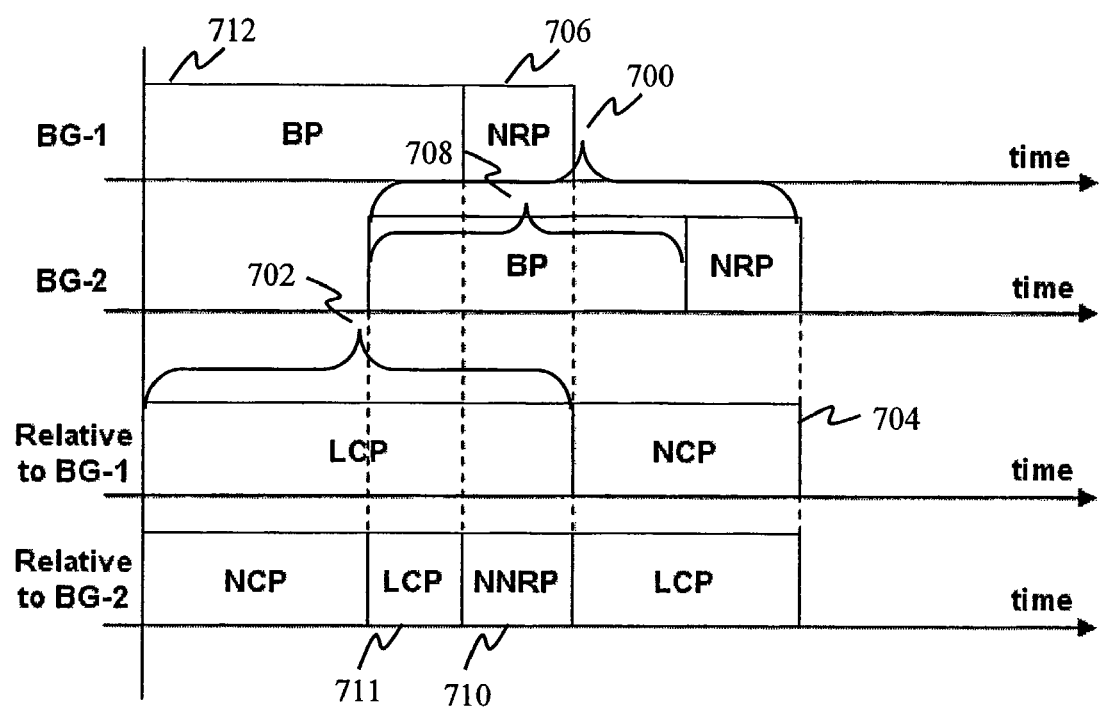
FIG. 7 shows the case when a neighbor BG's CP overlaps the LCP according to an example embodiment.

The CP 700 of a neighboring BG-2 may also overlap with the LCP 702 of a BG-1, as shown in FIG. 7. In that case, the non-overlapped portion of the CP 700 of the neighboring BG-2 will form a NCP 704 relative to BG-1. In the example embodiment, devices also take note of an overlapping BG's NRP. If e.g. the NRP 706 of BG-1 overlaps with BP 708 of BG-2, the BSs must be marked as Neighbor NRP (NNRP) 710 relative to BG-2 and not be used by any device in the BG-2 for beaconing. If there are already devices beaconing in those slots, collision resolution protocol shall be initiated to prevent those devices from beaconing in those NNRP 710 slots.

In the example embodiment, each device, e.g. of BG-1, beacons during the BP e.g. 712 in the devices LCP 702, and in the device's respective BS. In other BSs, each device listens for other device's beacon frame. The NRP 706 in the LCP 702 is used to communicate network related commands or announcements. Alternatively, it can be used to send short asynchronous data. Within the NRP 706, a priority-based contention medium access mechanism is used. Devices sending commands or announcement content may have a higher priority compared to a device wishing to send data. This can ensure the medium access goes first to important command and announcement use. In addition to beaconing and listening during LCP 702, each device in BG-1 is also required to listen outside the LCP 702 for any beacon broadcast from neighboring BGs.

When a listing device detects a neighboring BG, that listing device first protects the neighboring BG's CP from being used by any device in the local BG of the listing device for data communications. To do so, the listing device includes in their beacon, a list of NCPs, corresponding to the CPs of the neighboring BG detected. The format to describe a NCP can be a "start MAS, end MAS", "start MAS, length of NCP", or different combinations or formats in different embodiments.

After protecting a neighboring BG's CP, the listing device also checks whether the local BG's CP is itself being protected by the neighboring BG. This can be checked from listening to beacon broadcasts during the neighboring BG's BPs, i.e. in the NCPs relative to the listening device. If there are no devices in the neighboring BG protecting the local BG, the listing device announces its BG's presence. This announcement may be done by contenting in the neighboring BG's NRP with the highest priority, to send the announcement frame. A device that hears a neighboring BG announcement frame during the NRP shall include the neighbour BG information in its beacon in the following superframe. This can ensure that all devices in the BG are informed of the announcement. After sending the announcement frame, the device shall listen into the next superframe of the neighboring BG to verify if any device in the neighboring BG has heard the announcement. The device then includes any such neighboring device in the next beacon announcement. If no neighboring devices are heard protecting the local BG, the listing device performs the announcement procedure again until at least one neighboring device is heard protecting the listing device's local BG's CP.

Figure 8:
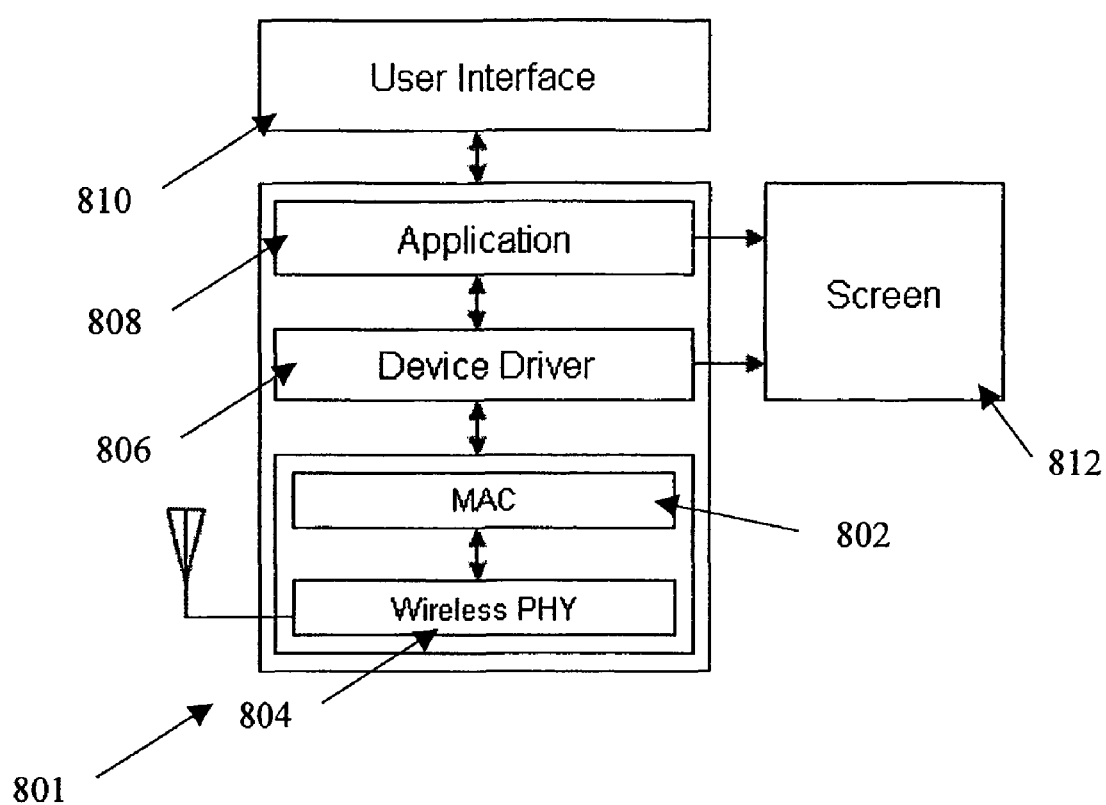
FIG. 8 shows a schematic drawing of a device for use in multiple wireless networks management according to an example embodiment.

With reference to FIG. 8, there is illustrated an electronic device 801 for use in an example embodiment of the present invention. The device 801 illustrated is a wireless communication device that consists of a wireless physical layer PHY 802 to enable wireless communication; a Medium Access Control (MAC) layer 804 to control how the wireless medium is to be shared and used. A method according to an embodiment of the present invention is applied in the MAC layer 804; a Device driver 806 to use the services provided by the MAC layer 804, a chipset (not shown) in the wireless PHY layer 802; an application software 808 that uses the device driver 806 to control the communication, and an interface 810 and screen hardware 812 to deliver to a user the required user-application. The Interface 810 also enables user input, and the screen 812 displays application-specific data to the user.

Figure 9:
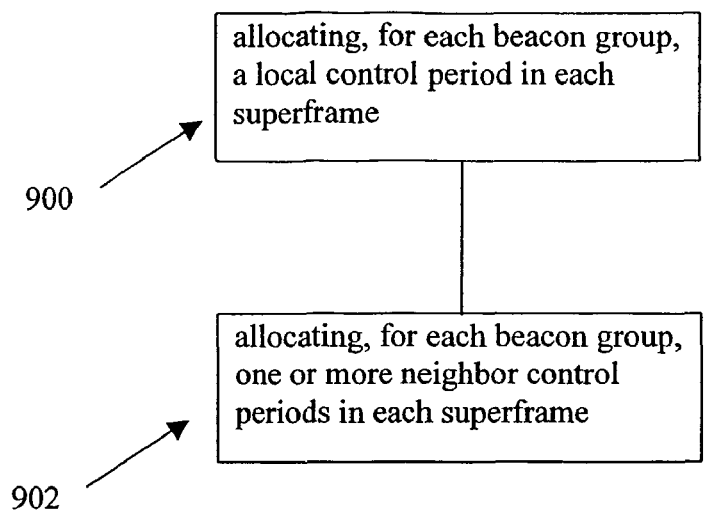
FIG. 9 shows a flowchart of a method of managing a wireless multiple networks structure comprising a plurality of beacon groups each comprising one or more devices communicating via an associated wireless network utilising a superframe structure, according to an embodiment of the present invention.

FIG. 9 shows a flowchart of a method of managing a wireless multiple networks structure comprising a plurality of beacon groups each comprising one or more devices communicating via an associated wireless network utilising a superframe structure, according to an embodiment of the present invention. At step 900, a local control period is allocated for each beacon group in each superframe. At step 902, one or more neighbor control periods are allocated for each beacon group in each superframe. The neighbor control periods in each beacon group cover all one or more control periods of other beacon groups detected by one or more of the devices in said each beacon group to an extent as said control periods do not overlap with the local control period in said each beacon group.

Figure 10:
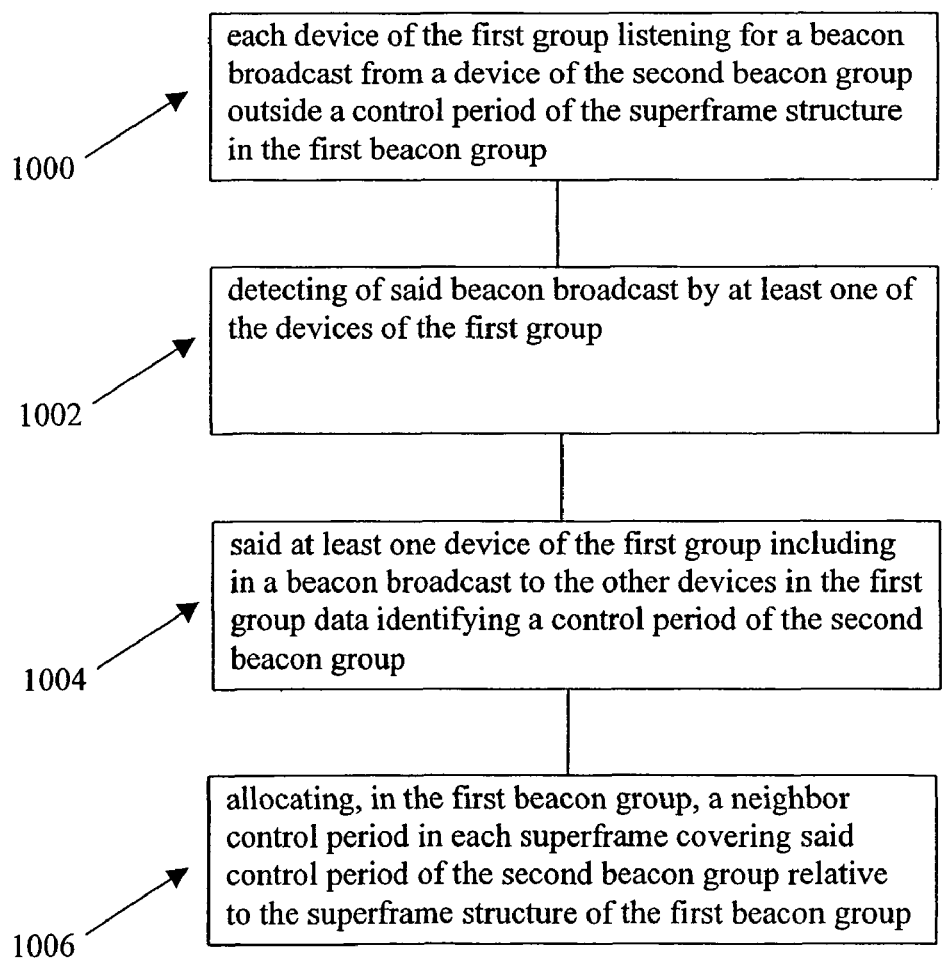
FIG. 10 shows a flowchart of a method of announcing the presence of a first beacon group to a second beacon group, each beacon group comprising one or more devices communicating via an associated wireless network utilising a superframe structure, according to an embodiment of the present invention.

FIG. 10 shows a flowchart of a method of announcing the presence of a first beacon group to a second beacon group, each beacon group comprising one or more devices communicating via an associated wireless network utilising a superframe structure, according to an embodiment of the present invention. At step 1000, each device of the first group listens for a beacon broadcast from a device of the second beacon group outside a control period of the superframe structure in the first beacon group. At step 1002, said beacon broadcast is detected of by at least one of the devices of the first group. At step 1004, said at least one device of the first group includes in a beacon broadcast to the other devices in the first group data identifying a control period of the second beacon group. At step 1006, a neighbor control period is allocated in the first beacon group in each superframe covering said control period of the second beacon group relative to the superframe structure of the first beacon group.

Figure 11:
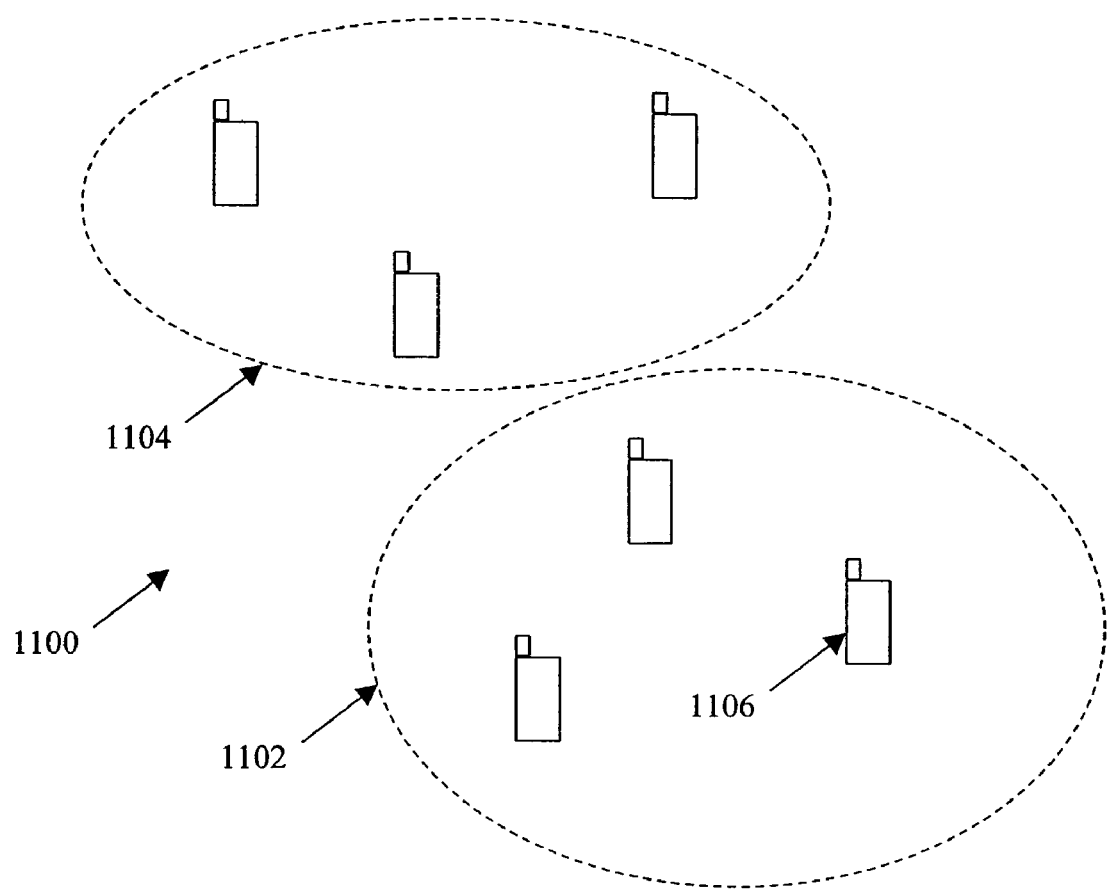
FIG. 11 shows a schematic drawing of a multiple wireless networks structure according to an example embodiment.

FIG. 11 shows a schematic drawings of a multiple wireless networks structure 1100 comprising according to an embodiment of the present invention. The multiple wireless networks structure 1100 comprises a plurality of beacon groups e.g. 1102, 1104, each comprising one or more devices e.g. 1106 communicating via an associated wireless network utilising a superframe structure. Each device e.g. 1106 of each beacon group e.g. 1102 allocates a local control period and one, or more neighbor control periods in each superframe. The neighbor control periods in each beacon group e.g. 1102 cover all one or more control periods of other beacon groups e.g. 1104 detected by one or more of the devices 1106 in each beacon group e.g. 1102 to an extent as the control periods do not overlap with the local control period in each beacon group e.g. 1102.

The embodiments described can provide a method to simplify the management of independent BGs, particularly in cases where multiple BGs' BP overlap. This embodiments described also seek to provide a method to achieve neighbour announcements without sacrificing any beacon slots in either local or neighbor BP.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A multiple wireless networks structure comprising:
   a plurality of beacon groups each comprising one or more devices communicating via an associated wireless network utilizing a superframe structure;
   wherein each device of each beacon group allocates a local control period and one or more neighbor control periods in each superframe of said each beacon group, wherein the neighbor control periods in each beacon group cover all one or more control periods of other beacon groups detected by one or more of the devices in said each beacon group to an extent as said neighbor control periods do not overlap with the local control period in said each beacon group; and wherein un-reserved data periods of the superframes of the respective beacon groups overlap.

2. The multiple networks structure as claimed in claim 1, wherein the superframes of the respective beacon groups further comprise one or more data periods outside the local control period and the neighbor control periods, for data communications.

3. The multiple networks structure as claimed in claim 1, wherein the local control period of each beacon group comprises a beacon period for beacon announcements in said each beacon group, and a non-reservation period for communications other than said beacon announcements in said each beacon group.

4. The multiple networks structure as claimed in claim 3, wherein the superframes of the respective beacon groups further comprise one or more data periods outside the local control period and the neighbor control periods, for data communications.

5. The multiple networks structure as claimed in claim 3, wherein the local control period of each beacon group further comprises one or more neighbor non-reservation periods covering respective non-reservation periods of one or more other beacon groups detected by one or more devices in said each beacon group to an extent as said respective non-reservation periods do overlap with the beacon period in said each beacon group.

6. The multiple networks structure as claimed in claim 3, wherein the superframes of the respective beacon groups further comprise one or more data periods outside the local control period and the neighbor control periods, for data communications.

7. A method of managing a wireless multiple networks structure comprising a plurality of beacon groups each comprising one or more devices communicating via an associated wireless network utilizing a superframe structure, the method comprising:
   allocating, for each beacon group, a local control period and one or more neighbor control periods in each superframe of said each beacon group;
   wherein the neighbor control periods in each beacon group cover all one or more control periods of other beacon groups detected by one or more of the devices in said each beacon group to an extent as said neighbor control periods do not overlap with the local control period in said each beacon group; and wherein un-reserved data periods of the superframes of the respective beacon groups overlap.

8. The method as claimed in claim 7, wherein the superframes of the respective beacon groups further comprise one or more data periods outside the local control period and the neighbor control periods, for data communications.

9. The method as claimed in claim 7, wherein the local control period of each beacon group comprises a beacon period for beacon announcements in said each beacon group, and a non-reservation period for communications other than said beacon announcements in said each beacon group.

10. The method as claimed in claim 9, wherein the superframes of the respective beacon groups further comprise one or more data periods outside the local control period and the neighbor control periods, for data communications.

11. The method as claimed in claim 9, wherein the local control period of each beacon group further comprises one or more neighbor non-reservation periods covering respective non-reservation periods of one or more other beacon groups detected by one or more devices in said each beacon group to an extent as said respective non-reservation periods do overlap with the beacon period in said each beacon group.

12. The method as claimed in claim 11, wherein the superframes of the respective beacon groups further comprise one or more data periods outside the local control period and the neighbor control periods, for data communications.

13. A method of announcing the presence of a first beacon group to a second beacon group, each beacon group comprising one or more devices communicating via an associated wireless network utilizing a superframe structure, the method comprising:
   each device of the first group listening for a beacon broadcast from a device of the second beacon group outside a control period of the superframe structure in the first beacon group;
   detecting of said beacon broadcast by at least one of the devices of the first group;
   said at least one device of the first group including in a beacon broadcast to the other devices in the first group data identifying a control period of the second beacon group; and
   allocating, in the first beacon group, a neighbor control period in each superframe covering said control period of the second beacon group relative to the superframe structure of the first beacon group and wherein un-reserved data periods of said each superframe overlap with un-reserved data periods of superframes of the second beacon group.

14. The method as claimed in claim 13, further comprising
   said at least one device of the first beacon group listening during said neighbor control period for beacon broadcasts from one or more devices of the second group; and
   determining whether any such beacon broadcast comprises data identifying the control period of the first beacon group.

15. The method as claimed in claim 14, further comprising said at least one of the devices of the first beacon group making an announcement during said neighbor control period.

* * * * *